Dec. 20, 1966  P. H. McDANIEL  3,292,434
COMBINATION LIQUID LEVEL INDICATOR AND TEMPERATURE GAUGE
Filed March 26, 1965

INVENTOR
PAUL H. McDANIEL
by Albert L. Jeffers
ATTORNEY

United States Patent Office 3,292,434
Patented Dec. 20, 1966

3,292,434
COMBINATION LIQUID LEVEL INDICATOR AND
TEMPERATURE GAUGE
Paul H. McDaniel, 1706 Mayflower Road,
Fort Wayne, Ind. 46807
Filed Mar. 26, 1965, Ser. No. 443,148
12 Claims. (Cl. 73—292)

This invention relates to indicators or gauges and is particularly concerned with an instrument of this nature which is used for indicating liquid level and for also indicating the temperature of the liquid of which the level is indicated, and more particularly to a combined instrument embodying both the level indicator and the temperature indicator in a single unit.

Many times in industrial and commercial installations there is a body of liquid of which the quantity or level in a container and temperature thereof is to be determined. Such bodies of liquid might be oil, or chemicals, or any other liquid that might be encountered in this manner. Heretofore, a simple manner of measuring the liquid level took the form of a sight glass in which the liquid level corresponded to that of the body of liquid in the container. Separate temperature sensing devices in the form of thermometers or the like were also supplied for measuring the temperature of the liquid. With the two instruments separate and independent, separate mountings therefor were required on a container within which the body of liquid was contained. This is, of course, expensive and likewise tends to separate the instruments from each other. Still further, it has been found that temperature sensing instruments, in particular, have tended to leak and heretofore have not been entirely satisfactory for that reason.

With the foregoing in mind, it becomes a primary objective of the present invention to provide improved instrumentation for measuring the level of the body of liquid and also for measuring the temperature thereof.

Still another object of this invention is the provision of a combined instrument which will at one time indicate the level of the body of liquid and the temperature thereof.

A still further object of this invention is the provision of an instrument for measuring the level of the body of liquid and the temperature thereof in which the temperature indicating instrument is embodied in the level indicating instrument and protected thereby against damage.

Still another object of the present invention is the provision of an instrument of the nature referred to which can readily and quickly be read at a single glance.

The foregoing objects as well as other objects and advantages of the present invention will become more apparent on reference to the following specification taken in connection with the accompanying drawing, in which.

Figures 1, 2, 3:
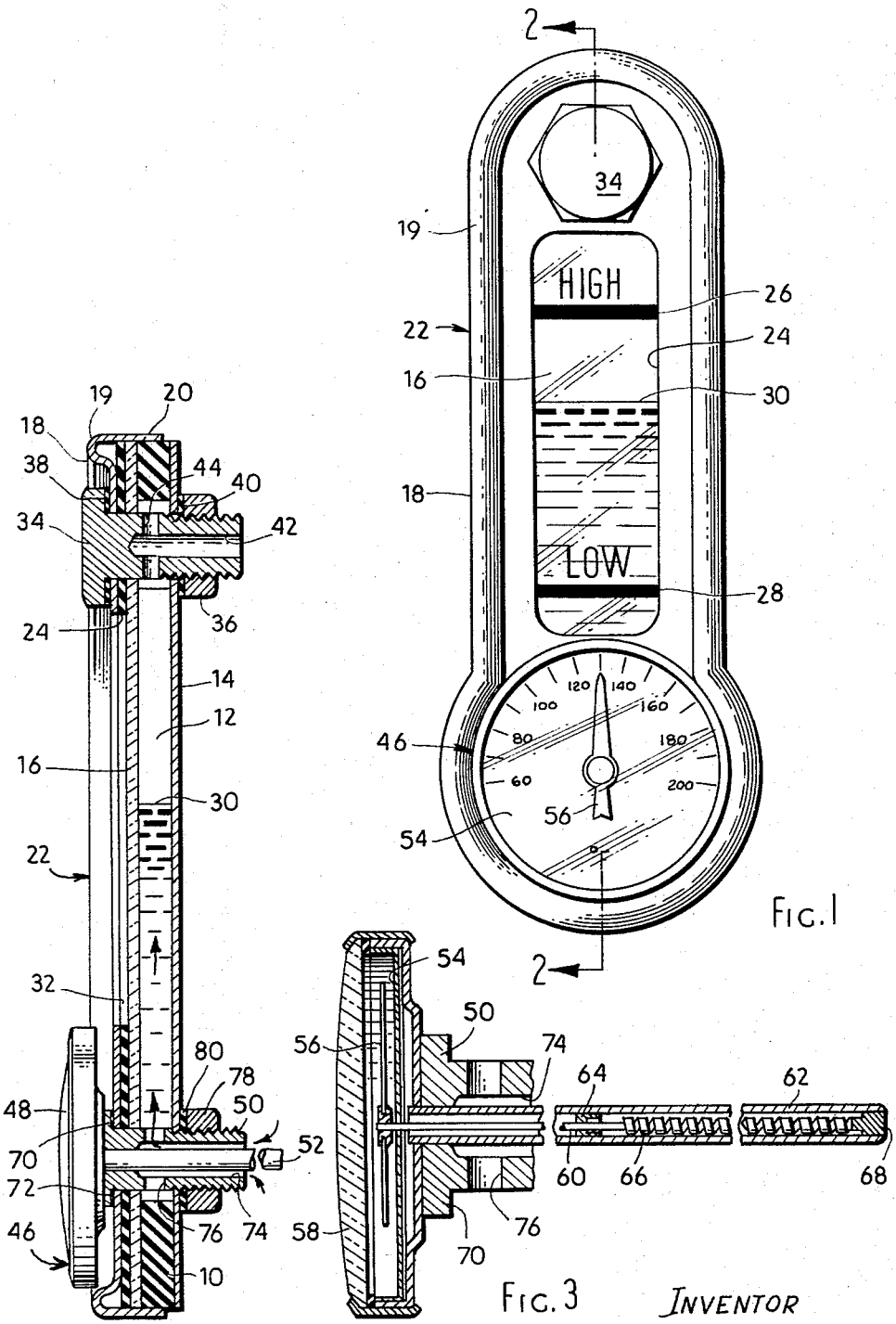
FIGURE 1 is a front elevational view of the combined instrument according to the present invention.
FIGURE 2 is a vertical sectional view through the instrument indicated by line 2—2 on FIGURE 1; and, FIGURE 3 is a longitudinal sectional view taken through the temperature indicating instrument showing details of construction thereof and at a larger scale than that of FIGURE 2.

In the specification referring to the drawing the somewhat more detail, the instrument according to the present invention will be seen to comprise a body part 10 which may consist of gasket material or the like. Such a material has the advantage of being inexpensive and also simultaneously provides sealing means when the instrument is assembled. Within the body part there is formed a chamber 12 in which the liquid to be measured is received. The back of chamber 12 is closed by a plate 14, aluminum, for example, which is pressed against body part 10 and therefore sealingly engages the said body part. A sealing cement or the like could be employed between back plate 14 and body 10 if so desired.

The front end of cavity or chamber 12 is closed by a window 16 which may be glass or plexiglass and which also sealingly engages body part 10 and which, furthermore, may be sealed thereto by a suitable cement if so desired.

A case 18 is provided, of formed steel, for example, which fits over the face of window 16 and which has a projecting peripheral rib portion 19 surrounding the face of the instrument, and a rearwardly projecting flange 20 that surrounds the periphery of glass 16 and at least a portion of the periphery of body part 10. The said case, identified generally by reference numeral 22, has a central opening 24 therein through which glass 16 is visible and therefore the liquid standing behind glass 16. As will be seen in FIGURE 1, the glass preferably has a high level mark 26 thereon and a low level mark 28 thereon so that the liquid level, which is shown at 30, can readily be observed. There is advantageously provided a glass 16 and additional gasket 32 which will not only seal between the case and the glass but will also provide the cushioning means therefor.

The assembly is secured together by a special bolt 34 at the upper end which extends through apertures provided therefor in case 22, glass 16, back plate 14, and upper region of chamber 12. A nut 36 at the back of the instrument is threaded on bolt 34 and clamps the several parts of the instrument together. A gasket 38 is provided under the head of bolt 34 to provide for sealing engagement of the bolt with case 22. Similar sealing means, which might take the form of a gasket 40, is provided between nut 36 and aluminum back plate 14. Bolt 36 has an axial bore 42 therein extending from the backend inwardly to the region of chamber 12 and it has at least one diametral bore 44 within the range of chamber 12 so that chamber 12 directly communicates with the bore 42.

At the bottom of the instrument the corresponding bolt takes the form of a temperature indicating gauge generally designated 46 and comprising a head portion 48, a shank portion 50, and a portion of 52 extending into the liquid to be measured. As will be best seen in FIGURE 3, taken together with FIGURE 2, the head portion has therein a dial 54 over which a pointer 56 sweeps while the said pointer can be observed through a covered glass 58. The pointer 56 is mounted on a shaft 60 that extends into a tube 62 that is fixed to aforementioned shank portion 50. At its end opposite the pointer 56, shaft 60 passes through a support bearing 64 and is connected to one end of the bi-metal strip 66, the other end of which is secured to a plug member 68 closing the extreme end of tube 62. Changes in temperature picked up by bi-metal 66 will result in rotation of shaft 60 and a corresponding deflection of pointer 56 will rescale 54 which is, as illustrated, graduated in degrees of temperature.

The shank portion 50 is constructed similarly to bolt 34, above described, and has a head portion 70 beneath which there is placed a gasket 72 for sealing engagement of the said head portion with case 22. The shank 50 also has an axial bore 74 through which the portion 52 of the instrument extends and this bore communicates by means of diametral bore 76 with the lower end of chamber 12. A nut 78, threaded to the shank portion and preferably sealed to back plate 14 by gasket 80, is provided for clamping the lower end of the assembly together.

The threaded ends of bolt 34 and the shank of the temperature indicating instrument are availed of for mounting the combined instrument directly on a container such as a tank or reservoir, or for receiving tubing or the like leading from the combined instrument to the tank or reservoir. In any case, fluid is free to enter the instrument through the shank of the temperature indicating instrument and air or vapors or the like will return to the tank through bolt 34.

It will be appreciated that the instrument can readily be observed at any time and will give a clear indication of liquid level and temperature of the liquid. It will furthermore be appreciated that the instrument is quite compact and can readily be mounted either directly on a tank or reservoir, or on a panel immediately adjacent thereto. It is particularly pointed out that case 22 shields and protects the entire instrument and because of the raised rib portion 18 it will also protect the somewhat projecting temperature gauge from damage. Further, the entire instrument is easy to manufacture, install and is relatively inexpensive to maintain, or if necessary, to replace.

A particular benefit that is to be realized from the forming of the body portion from a resilient gasket material and providing a metal case having a rim portion surrounding the body portion is the possibility of mounting the instrument directly on the side of a tank and pulling the bolts up tight enough by nuts on the inside of the tank to compress the body portion and bring the rim of the metal cover into engagement with the wall of the tank. This would make a particularly neat and compact arrangement and the body portion would, of course, provide more than adequate sealing about the bolts where they extend through the tank wall.

Under these circumstances, of course, the thin aluminum back plate would be removed so that the body portion would rest directly against the wall of the tank.

The rib around the metal case on the front side would, under these circumstances, be of benefit, in addition to its protective capacity, in stiffening the metal case against bending.

As to the material of the body portion, the particular liquid in the tank would dictate this material and it might be of a rubber, or a rubber-like material, as well as other gasket-like materials, especially of a resilient nature.

In view of the foregoing description taken in conjunction with the accompanying drawing, it is believed that a clear understanding of the device will be quite apparent to those skilled in this art. A more detailed description is accordingly deemed unnecessary.

It should, of course, be understood that the description and drawing herein are illustrative merely and that various modifications and changes may be made in the structure disclosed without departing from the spirit of the invention.

I claim:

1. An instrument for measuring the level and temperature of a body of liquid comprising; a body having a chamber to receive fluid, a transparent member closing said chamber on the front side of the instrument to provide for observation of the liquid therein and sealed to said body, a temperature measuring instrument having an indicating portion and a sensing portion operatively connected thereto and having a shank portion connected to said portions and extending through said transparent member and chamber and out the back of the instrument, and passage means formed in said shank portion in fluid communication with said chamber and through which said sensing portion extends.

2. An instrument for measuring the level and temperature of a body of liquid comprising; a body having a chamber to receive fluid, a transparent member closing said chamber on the front side of the instrument to provide for observation of the liquid therein and sealed to said body, a temperature measuring instrument having an indicating portion and a sensing portion operatively connected thereto and having a shank portion connected to said portions and extending through said transparent member and chamber and out the back of the instrument, passage means formed in said shank portion in fluid communication with said chamber and through which said sensing portion extends, and a metal case on said instrument including a rib upstanding around the periphery of the front side of the instrument and at least partially protecting the indicating portion of said temperature measuring instrument from damage.

3. An instrument for measuring the level and temperature of a body of liquid comprising; a body having a chamber to receive fluid, a transparent member closing said chamber on the front side of the instrument to provide for observation of the liquid therein and sealed to said body, a temperature measuring instrument having an indicating portion and a sensing portion operatively connected thereto and having a shank portion connected to said portions and extending through said transparent member and chamber and out the back of the instrument, passage means formed in said shank portion in fluid communication with said chamber and through which said sensing portion extends, a metal case on said instrument including a rib upstanding around the periphery of the front side of the instrument and at least partially protecting the indicating portion of said temperature measuring instrument from damage, and said metal case extending over said transparent member and being apertured to expose the portion of the transparent member which is to be observed.

4. An instrument for measuring the level and temperature of a body of liquid comprising; a body having a chamber to receive fluid, a transparent member closing said chamber on the front side of the instrument to provide for observation of the liquid therein and sealed to said body, a temperature measuring instrument having an indicating portion and a sensing portion operatively connected thereto and having a shank portion connected to said portions and extending through said transparent member and chamber and out the back of the instrument, passage means formed in said shank portion in fluid communication with said chamber and through which said sensing portion extends, a metal case on said instrument including a rib upstanding around the periphery of the front side of the instrument and at least partially protecting the indicating portion of said temperature measuring instrument from damage, said metal case extending over said transparent member and being apertured to expose the portion of the transparent member which is to be observed, said metal case including flange means surrounding the periphery of said body, and said case being at least in part secured to said instrument by said shank portion of said temperature measuring instrument.

5. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank.

6. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank, said instrument comprising a metal case having a flange surrounding said body and a rib upstanding at the perimeter of the body and a flat portion extending over said transparent member and apertured to expose the portion of said transparent member which is to be observed, said flat portion extending beneath the heads of said bolt means so as to be retained in place thereby.

7. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank, said instrument comprising a metal case having a flange surrounding said body and a rib upstanding at the perimeter of the body and a flat portion extending over said transparent member and apertured to expose the portion of said transparent member which is to be observed, said flat portion extending beneath the heads of said bolt means so as to be retained in place thereby, and gasket means between the heads of said bolt means and said metal case and between the metal case and said transparent member.

8. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank, said instrument comprising a metal case having a flange surrounding said body and rib upstanding at the perimeter of the body and a flat portion extending over said transparent member and apertured to expose the portion of said transparent member which is to be observed, said flat portion extending beneath the heads of said bolt means so as to be retained in place thereby, and said transparent member including high and low level indicia thereon.

9. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank, said instrument comprising a metal case having a flange surrounding said body and rib upstanding at the perimeter of the body and a flat portion extending over said transparent member and apertured to expose the portion of said transparent member which is to be observed, said flat portion extending beneath the heads of said bolt means so as to be retained in place thereby, and gasket means between the heads of said bolt means and said metal case and between the metal case and said transparent member, and said body comprising a blade of gasket material.

10. An instrument for measuring the level and temperature of a body of liquid comprising; a body having a chamber therein open on at least the side toward the front of the instrument, a transparent member sealingly mounted on said body and closing the open side of the chamber and providing for observation of the liquid level in the chamber, upper and lower bolt means having heads on the front side of the instrument and threaded shanks extending through said transparent member and chamber and out the back of the instrument, passage means leading into said shanks from the lead ends thereof and in fluid communication with said chamber for the movement of fluid to and from said chamber, and a temperature measuring instrument fixed to said lower bolt means and having an indicating head at the head end of the lower bolt means and a sensing element extending through the passage means of the shank of the lower bolt means and projecting from the back end of the said shank, said instrument comprising a metal case having a flange surrounding said body and a rib upstanding at the perimeter of the body and a flat portion extending over said transparent member and apertured to expose the portion of said transparent member which is to be observed, said flat portion extending beneath the heads of said bolt means so as to be retained in place thereby, gasket means between the heads of said bolt means and said metal case and between the metal case and said transparent member, said body comprising a blade of gasket material, and said chamber extending completely through said body, a plate on back of the body closing the back of the chamber and through which plate said shanks of the bolt means extend, said body sealingly engaging said plate and said transparent member when nuts are threaded to said shanks and drawn up thereon.

11. In an instrument for indicating the liquid level of a liquid; a resilient fluid impervious body portion in the form of a flat block having an elongated cavity therein open at least on the front side of the body portion, a transparent member on the front side of the body portion disposed over and closing said cavity, a metal case having a rim portion surrounding said body portion and a portion extending over said transparent member and apertured in the region that the transparent member is to be observed, headed bolt means having threaded shanks extending through said metal case, said transparent member and said body portion from the front of the instrument in the region of the top and bottom of said cavity, said threaded shanks extending out the back of said body portion, passage means extending into the shanks of said bolt means and communicating with said cavity, said body portion being compressible when the instrument is mounted on a tank wall to bring the edge of the rim portion of said metal case into engagement with said tank wall while said body portion sealingly engages said tank wall and said threaded shanks extend through the tank wall to receive nuts.

12. In an instrument for indicating simultaneously the liquid level and the temperature of a liquid; a resilient fluid impervious body portion in the form of a flat block having an elongated cavity therein open at least on the front side of the body portion, a transparent member on the front side of the body portion disposed over and closing said cavity, a metal case having a rim portion surrounding said body portion and a portion extending over said transparent member and apertured in the region that the transparent member is to be observed, headed bolt means having threaded shanks extending through said metal case, said transparent member and said body portion from the front of the instrument in the region of the top and bottom of said cavity, said threaded shanks extending out the back of said body portion, passage means extending into the shanks of said bolt means and communicating with said cavity, and a temperature measuring instrument having an indicating portion fixed to the head of the lower one of said bolt means and an imperforate tubular sensing element extending through the shank of said lower bolt means and out the end thereof, said body portion being compressible when the instrument is mounted on a tank wall to bring the edge of the rim portion of said metal case into engagement with said tank wall while said body portion sealingly engages said tank wall and said threaded shanks extend through the tank wall to receive nuts.

References Cited by the Examiner

UNITED STATES PATENTS

| 1,210,385 | 12/1916 | Hunziker | 73—323 |
| 1,570,938 | 1/1926 | Butler et al. | 73—292 |
| 2,045,507 | 6/1936 | Woodruff | 73—292 |
| 2,743,613 | 5/1956 | Kebbon | 73—363.9 |

FOREIGN PATENTS 977,900  12/1964  Great Britain.

LOUIS R. PRINCE, *Primary Examiner.*

DAVID SCHONBERG, *Examiner.*

F. H. THOMSON, S. C. SWISHER,
*Assistant Examiners.*